JUDSON S. SWEARINGEN
INVENTOR.

ATTORNEYS

United States Patent Office 3,375,903
Patented Apr. 2, 1968

3,375,903
ANTICAVITATIONAL ROTATIONAL POWER ABSORBER AND BEARING LUBRICATION SYSTEM THEREFOR
Judson S. Swearingen, 500 Bel Air Road, Los Angeles, Calif. 90024
Filed June 30, 1965, Ser. No. 468,274
14 Claims. (Cl. 184—6)

ABSTRACT OF THE DISCLOSURE

The device disclosed is a rotary type of power absorption mechanism in which a rotating shaft rotatably mounted in liquid cooled bearings extends into a turbulence chamber which is filled with a liquid suitable for lubricating the bearings. The turbulence chamber has two openings, one of which provides an intake and the other an outlet and the turbulator rotor within this chamber is so positioned that its action will not only create turbulence in liquid and transfer energy to the liquid, but will also tend to cause the liquid to flow out through the outlet. Inlet and outlet are connected together with a cooler in the circuit so that energy charged liquid from the outlet will pass through the cooler to give up its energy before it goes back into the inlet. In order to prevent cavitation in the inlet of the chamber a liquid pump having its intake connected to a suitable reservoir which may be at atmospheric pressure, has its outlet connected to the circuit through the turbulence chamber to maintain a sufficent pressure on the liquid going through such chamber that cavitation will not occur. The energy stripped cooled liquid leaving the cooler is also connected through a suitable filter to the bearing means to supply lubricant thereto and liquid lubricant drains from such bearing means back into the reservoir.

DISCLOSURE OF THE INVENTION

Figure 1:
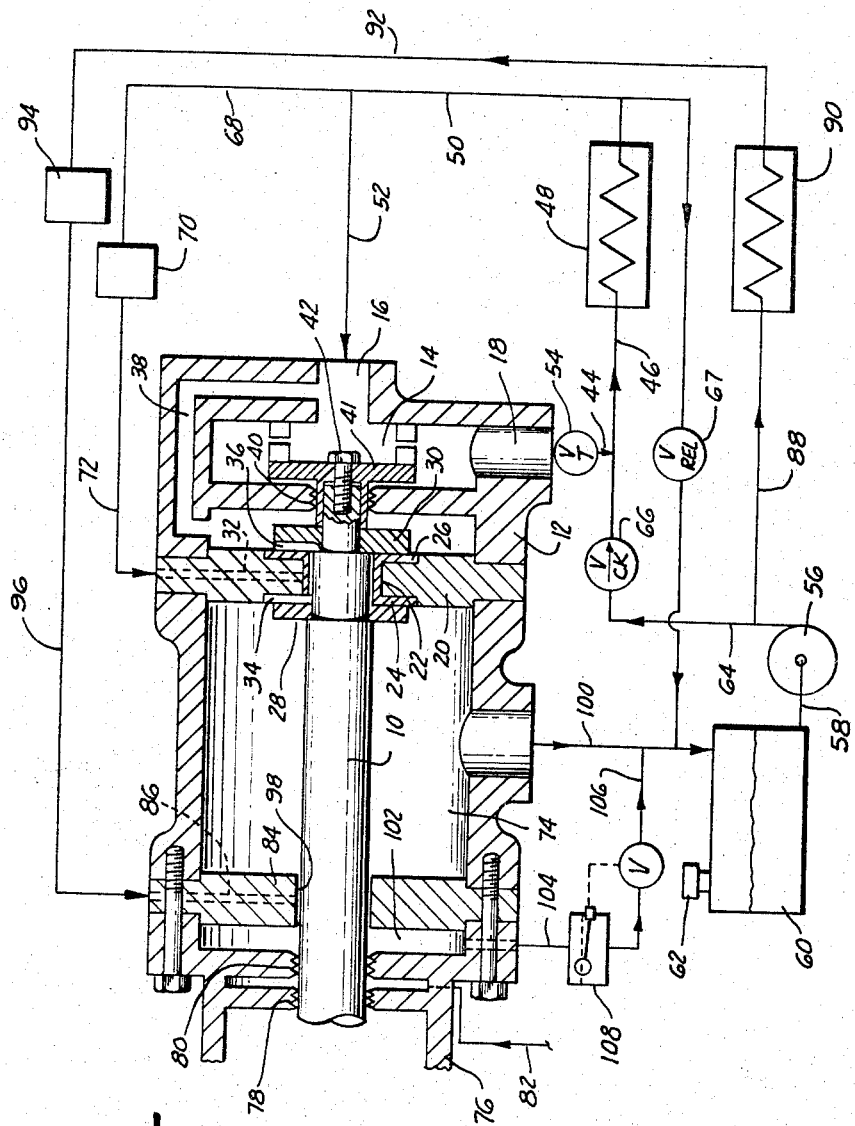

This invention relates to liquid filled rotational power absorbing devices in which power is transmitted into the device through a rotating shaft and in the device is converted into heat. It is particularly adapted to absorbing power from a low temperature turboexpander but it is not limited to such use.

Turboexpanders in cryogenic systems designed for expanding a gas through a turbine to lower pressure and lower temperature require that the power generated by expansion be removed from the gas system, as, for example, by converting this power into mechanical work at a location outside the gas system, so that the low temperature of the expanded gas may be maintained efficiently. It is thus necessary to provide some means for absorbing the power from the rotating shaft of the turboexpander. Frequently the power is used to drive pumps, compressors, or other power consuming devices. Substantially all or a part of the mechanical work resulting from the power generated in a turboexpander may be converted to heat at a distant location in this fashion and so eliminated from the gas system.

One type of apparatus for converting mechanical work into heat is a dynamometer comprising a chamber filled with a relatively high boiling liquid, such as oil, in which a rotor carried by a shaft through which the power is received rotates with said shaft and causes turbulence in the liquid. Heat generated by this turbulence in the liquid may then be absorbed in a suitable cooler or otherwise dissipated.

Turboexpanders often develop a large amount of power at very high rotational speeds such as, for example, in the range of 20,000 to 50,000 r.p.m. When the shaft of such a turboexpander extends into a liquid filled chamber of the type mentioned above and is equipped with a rotor to induce turbulence in the liquid, the presence of rotating components submerged in the liquid and driven at high speed tend to cause cavitation in the liquid and at the same time present substantial problems in maintaining the proper seal at the location where the shaft enters the chamber and renders it difficult to provide proper lubrication of the bearings for the shaft adjacent such chamber. Difficulty is also encountered in preventing stagnation of liquid in such a chamber in preventing the accumulation of trash and sludge which tends to take place in a closed liquid system of this character, and in insuring that all lubricant reaching the bearings is free from foreign matter which might foul or damage the bearings.

It is therefore an object of this invention to provide a rotational power absorber in which cavitation in connection with the operation of a high speed rotor will be avoided.

Another object is to provide a rotational power absorber in which the return of lubricant from the bearings will be at least in part by gravity to a reservoir maintained at substantially atmospheric pressure so as to facilitate the addition of lubricant as necessary and also the venting from the lubricant of any gas which might become entrained therein.

Another object is to provide such a power absorber in which the same pump may be employed for applying pressure to a liquid body acted upon by a high speed rotor to prevent cavitation due to the operation of such rotor, and for circulating lubricant to the bearings.

Another object is to provide a power absorber of the type referred to in which both the lubricant circulated through the bearings and the fluid acting to absorb power from a high speed rotor may be cooled by the same cooler.

Another object of this invention is to provide such a power absorber in which the same fluid is employed as a lubricant and as a power absorption liquid and in which means is provided for filtration of that portion of the liquid on its way to bearings to lubricate the same.

Another object of this invention is to provide a power absorber of said type in which the same body of liquid is employed as a power absorption liquid and as a lubricant for the bearings of the device and in which a thrust bearing structure for the absorber will itself cause flow of liquid through a portion thereof toward the higher pressure side of the bearing so that the bearing will form a seal.

Other objects and advantages of this invention will become apparent from the following description taken in connection with the accompanying drawings in which are set forth by way of illustration and example two different embodiments of this invention.

In the drawings:

FIG. 1 is a view through a power absorber of the type to which this invention is primarily applicable and embodying a diagrammatic showing of the lubricant and power absorption liquid circuits, in an arrangement employing a separately powered lubricant pump for supplying anticavitation pressure and circulating the lubricant, together with a bearing and seal arrangement in which the lubricant is made to seal the bearings against leakage therethrough.

Figure 2:
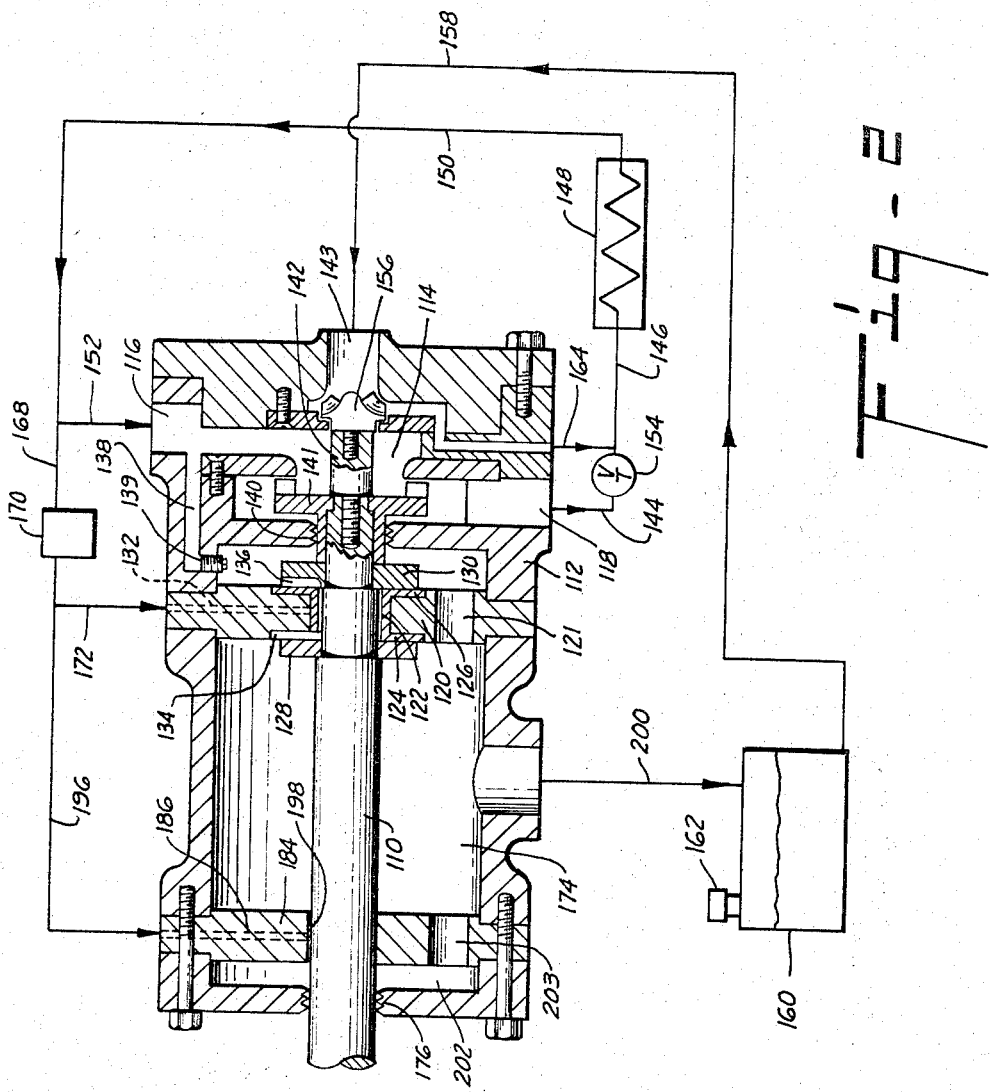

FIG. 2 is a view similar to FIG. 1 but showing an arrangement in which all lubricant return from the bearings is to a lubricant reservoir maintained under substantially atmospheric pressure with a more conventional sealing arrangement being provided for the device, and in which the pump for providing anti-cavitation pressure and circulation of the lubricant is mounted on the same shaft as the rotor for transferring power from the shaft to the power absorption liquid.

Referring now more in detail to the drawings, the device shown in FIG. 1 embodies a power-receiving shaft 10 adapted to receive power from a turboexpander or other device producing power to be absorbed, a housing 12 enclosing a portion of the length of the shaft 10 adjacent the end thereof and providing a power expansion chamber 14 therein having an inlet opening 16 and an outlet opening 18 through which fluid may enter and leave the chamber 14 respectively. The openings 16 and 18 obviously provide communication between the exterior of the housing and the chamber.

The end of the chamber 14 through which the shaft 10 enters is shown as being provided by a partition 20 closing such end of the housing 12 about the shaft 10 and providing a support about such shaft for a radial bearing 22 and thrust bearings 24 and 26. The shaft 10 on opposite sides of the partition 20 is likewise provided with mating disc-like bearing members 28 and 30 fixed on the shaft and rotatable therewith and engaging the thrust bearings 24 and 26, respectively, to hold the shaft against endwise movement. A lubricant duct 32 extending radially inwardly from the outer edge of the partition 20 to open at a point intermediate the ends of the radial bearing sleeve 22 supplies lubricant to such bearing sleeve intermediate its ends whence the lubricant is caused to flow in both directions in order to lubricate the radial bearing 22 and the thrust bearings 24 and 26. Flow of lubricant radially outwardly past the thrust bearing 24 and between it and the thrust bearing disc 28 is made possible by a groove or grooves 34 in the outer surface of the thrust bearing member 24. On the opposite side of the partition 20, radially outward flow of the lubricant is made possible by generally radially extending grooves 36 in the face of the disc bearing member 30 which is adjacent the thrust bearing member 26. It will readily be seen that when the shaft is rotating the resulting rotation of the disc 30 will cause this disc and its grooves 36 to act as a centrifugal pump and tend to force lubricant to flow from the intermediate point within the radial bearing 22, at which the lubricant enters the bearing 22 from duct 32, along the shaft toward the chamber 14.

Since the space on the left side of the partition 20, as seen in FIG. 1, will be maintained at substantially atmospheric pressure, lubricant will flow to the left from the intermediate point where duct 32 enters the bearing. The action of the grooved disc 30 will cause the flow of lubricant through the radial bearing 22 in the opposite direction from such intermediate point into the space to the right side of partition 20, which is in communication through the passageway 38 with the inlet 16 to the chamber 14, even though the pressure in such latter space be much higher than atmospheric. In such an arrangement the labyrinth type seal 40, although permitting leakage from the higher pressure space just upstream of the outlet 18 to the lower pressure space leading to the passageway 38, will serve as a restriction providing such a pressure drop between the pressure within the chamber 14 and the pressure to the left of the partition 20 that the passageway 38 will be adequate to maintain such pressure to the left of partition 20 at about the same value as that in the inlet 16. Since the pressure of lubricant entering the bearing through line 72 is also nearly the same as in inlet 16, the pressure generated by the rotating grooves will be sufficient to circulate lubricant through the right-hand portion of the bearing 22.

Within the chamber 14 the liquid agitating or power absorbing rotor 41 is located, the same being secured in place on the end of the shaft 10 by means of a cap screw 42 or any other suitable holding means so that the liquid agitating rotor 41 will rotate with the shaft 10 at all times. It will be seen that with the chamber 14 completely filled with liquid the agitator 41 will impart energy to the liquid by agitating the same and thereby transform the power being transmitted through the shaft 10 into heat energy within the liquid in the chamber 14, thereby raising its temperature. Preferably also the agitator 41 is so shaped and so located with respect to the intake 16 and the outlet 18 of the chamber 14 that upon rotation it will tend to cause some flow of liquid out through the outlet 18. This will produce flow of liquid through the liquid conducting means comprised of the line 44, the line 46, the cooler 48, the line 50, and the line 52, which liquid conducting means connects the outlet 18 to the input 16 of the chamber 14. The amount of flow through this liquid conducting means between the outlet and inlet of the chamber 14 may be controlled by a suitable orifice or throttling means 54 adjacent the outlet 18.

As previously mentioned, high speed rotation of the liquid agitating rotor 41 within the chamber 14 tends to produce cavitation within a liquid body in such chamber and in order to prevent such cavitation means are provided for maintaining a pressure on such body of liquid at all times. In accordance with this invention this is accomplished by means of a pump 56 whose intake line 58 draws liquid from the lower portion of a liquid reservoir 60 suitably vented at 62 to maintain its interior above the level of the liquid at ambient atmospheric pressure. While it is not essential that the pressure within the reservoir 60 remain exactly at the ambient atmospheric pressure, this may be conveniently done without impairing the operation of the remainder of the apparatus and makes possible the venting of any entrained gases which may be released within the reservoir 60 and also the ready replacement of liquid as the same may become necessary. The discharge from the pump 56 is conducted through a line 64 and a differential pressure regulator and check valve 66, into the liquid conducting means just downstream from the orifice or throttle 54. A pressure regulator or relief valve 67 may be located downstream from the cooler 48 to permit bypass of lubricant back to reservoir 60 when there is little or no flow through the chamber 14 or the bearings.

Furthermore, in accordance with this invention the pump 56 may be utilized both for supplying the anti-cavitation pressure to the chamber 14 and for supplying lubricant to the bearings for the shaft 10. To this end, the liquid within the chamber 14 is the same as the lubricant supplied to the bearings, and the line 50, 52 leading to the intake 16 is connected by means of an additional line 68 to a filter 70 and thence to a line 72 to the passageway 32 leading into the bearing 22. For the reasons heretofore explained, part of the liquid thus introduced into the bearing 22 will flow toward the right from the intermediate point of its introduction into the bearing 22 and be expelled toward the entrance to the chamber 14 through a passageway 38 by means of the action of the grooves 36 on the thrust bearing disc 30.

At the same time, a part of the liquid flowing to the bearing 22 will flow under the pressure of introduction of such liquid into the bearing in the opposite direction toward the thrust bearing disc 28 and thence through the grooves 34 in the partition 20 and into the lubricant collecting chamber 74 which remains at atmospheric pressure and likewise surrounds the shaft 10 and is within the composite housing of the power absorption device.

In case the opposite end of the housing is to be joined directly to the housing 76 of a turboexpander or the like in which relatively high pressures may exist, a seal arrangement may be provided consisting of spaced labyrinth seals 78 and 80 and a seal gas injected into the space between these labyrinth seals by suitable means such as the line 82. The pressure of such seal gas is preferably somewhat higher than that of the fluid in the space within the turboexpander just inside the seal 78, and hence will cause a slight flow of gas through the seal 78 toward the turboexpander and through the seal 80 toward the lubricant collecting chamber 74.

In accordance with this invention a partition 84 is provided between the seal 80 and the lubricant collecting chamber 74, and within this partition is another bearing for the shaft 10 into which lubricant is fed intermediate the ends of the bearing by means of a duct 86. The lubricant for this bearing is likewise supplied from the pump 56 but preferably through a separate line 88, cooler 90, line 92, filter 94 and line 96 so that the means for supplying lubricant to the bearing 98 in the partition 84 is independent of the liquid conducting means between the outlet 18 and the inlet 16 of the chamber 14. However, the lubricant supplied to both bearings will be cooled and filtered before being supplied to the bearing, that going to the bearing 22 being cooled by the cooler 48 and filtered by the filter 70, while that going to the bearing 98 is cooled by the cooler 90 and filtered by the filter 94. The cooler 48 thus serves the double purpose of cooling oil being supplied to the bearing 22 and of cooling and thereby extracting power from the oil flowing from the chamber 14 wherein it will have absorbed power from the agitator 41.

Lubricant supplied through the duct 86 to the bearing 98 will flow under the pressure of such supply means toward the lubricant collecting chamber 74 where it will be intermingled with that coming from the bearing 22 through the grooves 34. Thence all lubricant collected in the chamber 74 will be drained by gravity through the drain line 100 into the atmospheric pressure reservoir 60.

At the same time, the lubricant supplied through the line 96 will be supplied under such pressure as would be greater than that of the seal gas supplied through the line 82, and thus part of such lubricant will flow into the space between the bearing 98 and the seal 80 where it will fall by gravity to the bottom of the chamber 102 and thence flow into the line 104 and restrained from flowing through the line 106 to the lubricant reservoir 60 by means of a float operated drainer 108. This drainer will maintain a small quantity of liquid within itself and thus prevent the escape of seal gas from the chamber 102. When the drainage into the drainer 108 exceeds a predetermined amount, the excess will be drained off through the line 106 into the reservoir 60.

Turning now to FIG. 2, a modification is illustrated which is somewhat simplified but with the elimination of the use of lubricant to assist in the sealing function as was the case in FIG. 1, and with the elimination of a separate pump with its requirement for a separate power supply and the mounting of a pump for this purpose to be operated by the power-receiving shaft.

In this case the power-receiving shaft 110 has a portion of its length enclosed by a housing 112 which provides a chamber 114 about the shaft, this chamber having an inlet 116 and an outlet 118 just as in the case of the previously described embodiment of this invention. One extremity of the chamber is closed by the provision of a partition 120 similar to the partition 20, except that in the arrangement there shown, the partition 20 is imperforate and the passageway to the inlet is open. However, as here shown, the partition 120 has an opening 121 therethrough adjacent its lower portion thereby connecting the space to the right of this partition with the lubricant collecting chamber to the left of the partition.

As in the previously described form of the invention, the partition carries a bearing 122 extending therethrough and thrust bearings 124 and 126 on the opposite sides thereof and the shaft has thrust bearing discs 128 and 130 cooperating with the bearings 124 and 126 respectively to provide means for preventing endwise movement of the shaft 110. This bearing system is supplied with lubricant through a duct 132 in the same manner as previously described and a portion of the oil flowing to the left from the point of its introduction into the bearing flows out through the grooves 134 to lubricate the thrust bearing 124 in the same manner as in the previous form.

The disc 130 may if desired be provided with grooves 136 which will assist in causing lubricant to flow through the thrust bearing 126, but the lubricant so flowing will not, in this FIG. 2 form, pass into the inlet 116 of the chamber 114 as in the previously described form but instead will fall by gravity to the bottom of the chamber and thence passed through the passageway 121 into the lubricant collection chamber. The passageway 138 may be provided for use if and as desired but when the opening 121 is present this passageway should be closed by suitable means such as the plug 139.

The seal around the shaft in this instance is provided in such form as to be capable of taking the pressure differential between the chamber 114 and the lubricant collection chamber which is exposed to the atmosphere. Such a seal is illustrated at 140. The main objection to this form employing opening 121 and plug 139 is that if seal 140 leaks excessively it may cause undesirable additional load on pump 156, presently to be described.

As in the previous form, a liquid agitating rotor 141 is suitably secured to the end of the shaft 110 but by such means as to leave a projection 142 beyond such rotor, the same extending into a small auxiliary chamber 143 for a purpose presently to be set forth.

As in the previous form, the outlet 118 opens into a line 144 which leads through a line 146 into the cooler 148 and from the cooler a line 150 and a line 152 complete a liquid conducting means for conducting liquid from the outlet 118 to the inlet 116 of the chamber 114. Similarly, an orifice or throttle 154 may be provided for regulating the rate of flow through this liquid conducting means and specifically through the cooler 148. As in the previous instance the rotor 141 will be so located and of such form that in rotation it will tend to cause some flow out through the outlet 118 and thus produce circulation through the liquid conducting means just described.

In order to provide the pressure within the chamber 114 necessary to prevent cavitation, a small pump rotor 156 is suitably secured to the end of the shaft projection 142 to be rotated by the shaft. When so rotated this pump rotor will draw fluid through a line 158 from the lubricant reservoir 160 which, as before, is maintained at substantially atmospheric pressure above the liquid therein and is provided with a suitable vent 162 for this purpose. The output from the pump impeller 156 will pass into chamber 114, either directly or through a line 164 into the liquid conducting means just described and provide the same with pressure which will be transmitted into the chamber 114 and prevent cavitation therein by the operation of the rotor 141.

Unlike in the previously described form of the invention, only one cooler 148 is employed and all of the lubricant passing from the outlet 118 and in through the inlet 116 of the chamber 114 will pass through the cooler 148, as will also all of the lubricant passing to the bearings. In this instance, the line 150 will be connected to a line 168 leading to a filter 170 and thence through a line 172 to the duct 132 leading to the bearing 122. The same filter 170 will be connected to the other bearing also.

However, it is assumed in this case that the single seal 176 which is at the opposite end of the lubricant collection chamber 174 from the bearing 122 will not have to hold pressure against the extremely high pressure usually existing within a turboexpander, but rather will merely have to hold pressure against the very small differential that may exist between the lubricant collection chamber 174 and the outside atmosphere. Under these circumstances no seal gas will be required and only one labyrinth type seal may be employed. However, in order to provide the necessary bearing for the shaft 110 on the opposite side of the lubricant collection chamber 174 from the bearing 122, a partition 184 is employed just inboard of the seal 176 and this partition is provided with a duct 186 leading to the central opening in the partition which surrounds the shaft and opens into such opening intermediate the ends thereof. Lubricant will be supplied to the duct 186 through a line 196 leading from the filter 170, such lubricant being forced to flow to the bearing 198 within the partition 184 under the impelling force of the pump impeller 156.

Lubricants thus introduced into the bearing 198 intermediate its ends will flow in both directions therefrom, that flowing to the right emptying by gravity directly into the lubricant collection chamber 174 and that flowing to the left emptying through the lubricant collection chamber 202 and the opening 203 in the partition 184 into the lubricant collection chamber 174. All lubricant thus collected from both the bearing 122 and the bearing 198 and flowing in both directions from both of these bearings if opening 121 and plug 139 be used as shown, will flow from the lubricant collection chamber 174 through the lubricant drain line 200 by gravity into the lubricant reservoir 160. If opening 121 be not present or if it be plugged, and plug 139 be not used, the action will be the same as previously described in connection with FIG. 1.

It will readily be seen that while the apparatus illustrated in FIG. 2 does not provide for the use of lubricant to assist in maintaining the necessary seals, its employment under circumstances in which such sealing assistance is not required makes for a somewhat simpler arrangement employing fewer parts in the form of coolers, filters, extra pumps and the like, yet provides substantially all the advantages of the apparatus illustrated in FIG. 1, such as pressure for the prevention of cavitation in the power absorption chamber, the use of a single cooler for cooling both the lubricant for the bearings and the liquid which will have been heated in the power absorption chamber by the action of the rotor, and will furthermore provide for filtration of all lubricant just prior to entering the bearings of the device.

From the foregoing it will be seen that this invention is one well adapted to attain all of the ends and objects hereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. A rotational liquid loading power absorber comprising a power-receiving shaft, a housing enclosing and providing a chamber about a portion of the length of said shaft and having inlet and outlet openings between the exterior of said housing and said chamber, bearing and seal means carried by said housing surrounding said shaft, a liquid agitating rotor fixed on said shaft within said chamber and of a form and location relative to said openings to produce upon rotation in a body of liquid in said chamber a tendency to discharge said liquid through said outlet opening, liquid conducting means connecting said openings to one another including a liquid cooler, and means for lubricating said bearing means and maintaining pressure on liquid in said chamber to prevent cavitation within said chamber comprising a lubricant reservoir, a lubricant pump having an intake connected to the reservoir adjacent the lower portion of the reservoir and an output connected to said liquid conducting means and to said bearing means, and drain means for returning lubricant from said bearing means to said reservoir.

2. A rotational liquid loading power absorber as set forth in claim 1 in which said lubricant pump includes a rotor mounted on and driven by said shaft.

3. A rotational liquid loading power absorber as set forth in claim 1 in which the connection to said bearing means is intermediate the ends thereof and said bearing means includes a radially extending thrust member on said shaft between the housing and said agitating rotor having generally radially extending passageways therein forming a centrifugal impeller, the outer ends of said passageways being in communication with the inlet opening to said chamber and isolated from said drain means, whereby part of the lubricant from said bearing means will be forced into said chamber.

4. A rotational liquid loading power absorber as set forth in claim 1 in combination with means for forcing part of the lubricant from said bearing means directly into said chamber.

5. A rotational liquid loading power absorber as set forth in claim 1 in which the connection between said pump and said liquid conducting means is between said chamber outlet opening and said cooler.

6. A rotational liquid loading power absorber as set forth in claim 1 in which the connection between said pump and said bearing means includes said cooler.

7. A rotational liquid loading power absorber as set forth in claim 1 in which the connection between said pump and said bearing means includes a lubricant filter.

8. A rotational liquid loading power absorber as set forth in claim 7 in which the connection between said pump and said bearing means is independent of the liquid conducting means.

9. A rotational liquid loading power absorber as set forth in claim 1 in which the connection between said pump and said bearing means includes the portion of the liquid conducting means in which said cooler is located and includes a lubricant filter independent of the liquid conducting means.

10. A rotational liquid loading power absorber comprising a power-receiving shaft, a housing enclosing and providing a chamber about a portion of the length of said shaft and having inlet and outlet openings between the exterior of said housing and said chamber, a plurality of spaced bearing and seal means carried by said housing surrounding said shaft, a power absorbing rotor fixed on said shaft within said chamber and of a form and location relative to said openings to produce upon rotation in a body of liquid in said chamber a tendency to discharge said liquid through said outlet opening, liquid conducting means connecting said openings to one another including a liquid cooler, and means for lubricating said bearing means and maintaining pressure on liquid in said chamber to prevent cavitation within said chamber comprising a lubricant reservoir, a lubricant pump having an intake connected to the reservoir adjacent the lower end of the reservoir and an output connected to said liquid conducting means and at least two of said bearing means, and drain means for returning lubricant by gravity from each of said bearing means to said reservoir.

11. A rotational liquid loading power absorber as set forth in claim 10 in which the connection from said pump to at least one of said bearing means is independent of said liquid conducting means.

12. A rotational liquid loading power absorber as set forth in claim 10 in which there is a means for restraining part of the lubricant from one of said bearing means from flowing to said drain means and means for forcing said part of the lubricant directly from said last-mentioned bearing means into said chamber.

13. A rotational liquid loading power absorber as set forth in claim 12 in combination with means for restraining part of the lubricant from the other of said bearing means against flowing to said drain means and auxiliary drain means for draining said part of the lubricant from the other of said bearing means to said reservoir when the amount so restrained exceeds a predetermined quantity.

14. A rotational liquid loading power absorber comprising a power-receiving shaft, a housing enclosing and providing a chamber about a portion of the length of said shaft and having inlet and outlet openings between the exterior of said housing and said chamber, bearing and seal means carried by said housing surrounding said shaft, a power absorbing rotor fixed on said shaft within said chamber, liquid conducting means connecting said openings to one another, and means for lubricating said bearing means and maintaining pressure on liquid in said chamber to prevent cavitation within said chamber comprising a lubricant reservoir, a lubricant pump having an intake connected to the reservoir adjacent the lower portion of the reservoir and an output connected to said inlet opening to the chamber and to said bearing means to exert pressure on the liquid in said chamber and force lubricant to said bearing means, and drain means for returning lubricant from said bearing means to said reservoir.

References Cited

UNITED STATES PATENTS

| | | | |
|---|---|---|---|
| 1,759,074 | 5/1930 | Van Rijswijk | 277—3 |
| 2,217,329 | 10/1940 | Bentley | 184—6 |
| 2,272,128 | 2/1942 | Osbourne | 103—111 |
| 2,632,395 | 3/1953 | Jennings et al. | 103—111 |
| 3,038,318 | 6/1962 | Hanny | 62—38 |
| 3,221,511 | 12/1965 | Garrett | 62—402 X |

LAVERNE D. GEIGER, *Primary Examiner.*

E. J. EARLS, *Assistant Examiner.*

Disclaimer and Dedication

3,375,903.—*Judson S. Swearingen*, Los Angeles, Calif. ANTICAVITATIONAL ROTATIONAL POWER ABSORBER AND BEARING LUBRICATION SYSTEM THEREFOR. Patent dated Apr. 2, 1968. Disclaimer and Dedication filed Oct. 28, 1980, by the inventor.

Hereby disclaims and dedicates to the Public the entire remaining term of said patent.

[*Official Gazette January 27, 1981.*]